(12) United States Patent
Hatakoshi et al.

(10) Patent No.: US 6,457,378 B2
(45) Date of Patent: Oct. 1, 2002

(54) CONTROL LEVER EQUIPMENT FOR BAR HANDLE VEHICLE

(75) Inventors: Genichi Hatakoshi, Nagano (JP); Naoki Kobayashi, Nagano (JP)

(73) Assignees: Nissin Kogyo Co., Ltd., Ueda (JP); Honda Giken Kogyo Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/735,552

(22) Filed: Dec. 14, 2000

(30) Foreign Application Priority Data

Dec. 16, 1999 (JP) .............................. 11-357730

(51) Int. Cl.[7] .................................................. G05G 1/04
(52) U.S. Cl. ........................... 74/525; 74/489; 74/502.2
(58) Field of Search ........................ 74/525, 469, 543, 74/488, 526, 489, 500.5, 502.2

(56) References Cited

U.S. PATENT DOCUMENTS

| | | | | |
|---|---|---|---|---|
| 4,189,954 A | * | 2/1980 | Nakamura et al. | 74/473.13 |
| 4,425,819 A | * | 1/1984 | Shimano | 74/489 |
| 4,607,733 A | * | 8/1986 | Dodge | 477/194 |
| 4,699,018 A | * | 10/1987 | Tagawa | 74/473.13 |
| 4,920,818 A | * | 5/1990 | Nagano | 74/473.13 |
| 5,009,119 A | * | 4/1991 | Nagano | 267/74 |
| 5,020,387 A | * | 6/1991 | Nagano | 74/473.14 |
| 5,052,241 A | * | 10/1991 | Nagano | 74/473.13 |
| 5,203,213 A | * | 4/1993 | Nagano | 192/217 |
| 5,222,412 A | * | 6/1993 | Nagano | 74/489 |
| 5,257,683 A | * | 11/1993 | Romano | 192/217 |
| 5,333,515 A | * | 8/1994 | Schneider | 403/324 |
| 5,479,776 A | * | 1/1996 | Romano | 192/217 |
| 5,537,891 A | * | 7/1996 | Nagano et al. | 74/489 |
| 5,632,226 A | * | 5/1997 | Huang et al. | 116/28.1 |
| 5,676,022 A | * | 10/1997 | Ose | 74/489 |
| 5,685,271 A | * | 11/1997 | Taomo et al. | 123/398 |
| 5,860,326 A | * | 1/1999 | Lussier | 74/473.13 |
| 5,979,266 A | * | 11/1999 | Nagano | 74/489 |

FOREIGN PATENT DOCUMENTS

JP         7-17667         4/1995

* cited by examiner

Primary Examiner—David A. Bucci
Assistant Examiner—Julie K. Smith
(74) Attorney, Agent, or Firm—Armstrong, Westerman & Hattori, LLP

(57) ABSTRACT

The control lever equipment for a bar handle vehicle enables smooth pivoting of a grip allowance adjusting mechanism for a control lever with respect to a grip. In this equipment, the control lever is composed essentially of two pieces, i.e., a lever piece and an operating piece, which pivot coaxially independent of each other on a support shaft attached to a holder fixed to the handle bar. An adjusting pin for widening and narrowing the grip allowance between the control lever and the grip of the handle bar is attached either to the lever piece or to the operating piece pivotally on an axis parallel to the support shaft. A resilient piece is interposed between the adjusting pin and a bearing for bearing the shaft end of the adjusting pin, formed either on the lever piece or the operating piece, to be coaxial with the adjusting pin.

5 Claims, 5 Drawing Sheets

CONTROL LEVER EQUIPMENT FOR BAR HANDLE VEHICLE

BACKGROUND OF THE INVENTION

The present invention relates to a control lever equipment for operating a brake or a clutch in a vehicle having a steering bar handle at the front thereof, for example, in a motor bicycle, a motor tricycle and a three or four-wheeled bogie.

DESCRIPTION OF THE RELATED ART

A conventional control lever equipment for operating a brake or a clutch of a bar handle vehicle such as of a motor bicycle is provided with a control lever composed essentially of two pieces, i.e., a lever piece to be gripped and operated by a rider and an operating piece for operating a hydraulic master cylinder or a wire by gripping the lever piece; and a grip allowance adjusting mechanism interposed between the lever piece and the operating piece. An example of such equipment is disclosed in Japanese Unexamined Utility Model Publication (KOKOKU) No. 7-17667.

The grip allowance adjusting mechanism disclosed in the above publication contains an adjusting pin fitted pivotally in a supporting hole defined through the operating piece, a plurality of cam faces formed contiguously on the circumference of the shaft of the pin so that they are located at different distances from the axis of the adjusting pin respectively and an abutting face formed either on the operating piece or on the lever piece. The cam abutting face is abutted selectively against one of the cam faces to achieve widening and narrowing of the grip allowance between a grip attached to one end of a handle bar and the lever piece depending on the constitution and preference of the rider. The adjusting pin has the same number of recesses as the cam faces formed on the shaft end face intermittently along the periphery. A coil spring is located in an adjusting pin fitting hole of the operating piece, and a ball urged resiliently by the coil spring is engaged resiliently with a selected one of these recesses.

However, since the coil spring is attached to the adjusting pin to be offset from the axis thereof, the resilience of the coil spring acts as an offset load upon the adjusting pin to tilt it with respect to the central axis of the adjusting pin fitting hole. Thus, vibration during driving can cause backlash of the adjusting pin. Meanwhile, when the grip allowance is to be changed, the adjusting pin cannot be pivoted smoothly, and the adjusting pin is worn or damaged by interference with the lever piece and the operating piece, shortening the life of the control lever equipment.

SUMMARY OF THE INVENTION

It is an objective of the present invention to provide a control lever equipment for a bar handle vehicle, which enables smooth pivoting of the adjusting pin in adjusting a grip allowance, while preventing backlash of the adjusting pin fitted in the adjusting pin fitting hole.

The control lever equipment for a bar handle vehicle according to the present invention contains a support shaft attached to a holder fixed to a handle bar, a control lever pivotally supported by the support shaft and a grip allowance adjusting mechanism for widening and narrowing a grip allowance to be secured between the control lever and a grip of the handle bar. The control lever is composed essentially of the two pieces, i.e., a lever piece and an operating piece which pivot coaxially on the support shaft independent of each other. The grip allowance adjusting mechanism contains an adjusting pin attached either to the lever piece or to the operating piece pivotally on an axis parallel to the support shaft; a plurality of cam faces formed contiguously on the circumference of the shaft of the adjusting pin so as to locate at different distances from the axis of the adjusting pin respectively; and a cam abutting face formed either on the operating piece or on the lever piece. The cam abutting face is urged to be selectively brought into abutment with one of the cam faces by pivoting the adjusting pin. A resilient piece is interposed between the adjusting pin and a bearing for journalling the shaft end of the adjusting pin, formed either on the lever piece or on the operating piece, to be coaxial with the adjusting pin. The adjusting pin is engaged under the resilience of the resilient piece either by the lever piece or by the operating piece.

A typical example of the resilient piece is a coil spring disposed around the axis. The bearing is a recess, and the bottom of the bearing serves as a seat for the resilient piece.

Another typical example of the resilient piece is a leaf spring disposed around the axis. Further, the adjusting pin has a circumferential groove formed on the shaft thereof, which is to be engaged with the leaf spring.

According to the control lever equipment for a bar handle vehicle according to the present invention, since the resilience of the resilient piece acts axially upon the adjusting pin, the pin can be retained without tilting. As a result, the adjusting pin can be pivoted smoothly, and the grip allowance can be changed easily. In addition, no interference occurs between the adjusting pin and the control lever to cause either damage or wearing of them which are observed in the conventional equipment. Besides, no unnecessary load is applied to the components of the grip allowance adjusting mechanism, so that durability of the control lever equipment can be enhanced.

Other aspects and advantages of the invention will become apparent from the following description, taken in conjunction with the accompanying drawings which illustrate by way of examples the principles of the invention.

BRIEF DESCRIPTION OF THE DRAWINGS

The invention together with the objects and advantages thereof, may best be understood by reference to the following description of the presently preferred embodiments together with the accompanying drawings in which.

DETAILED DESCRIPTION OF THE PREFERRED EMBODIMENTS

Figure 1:
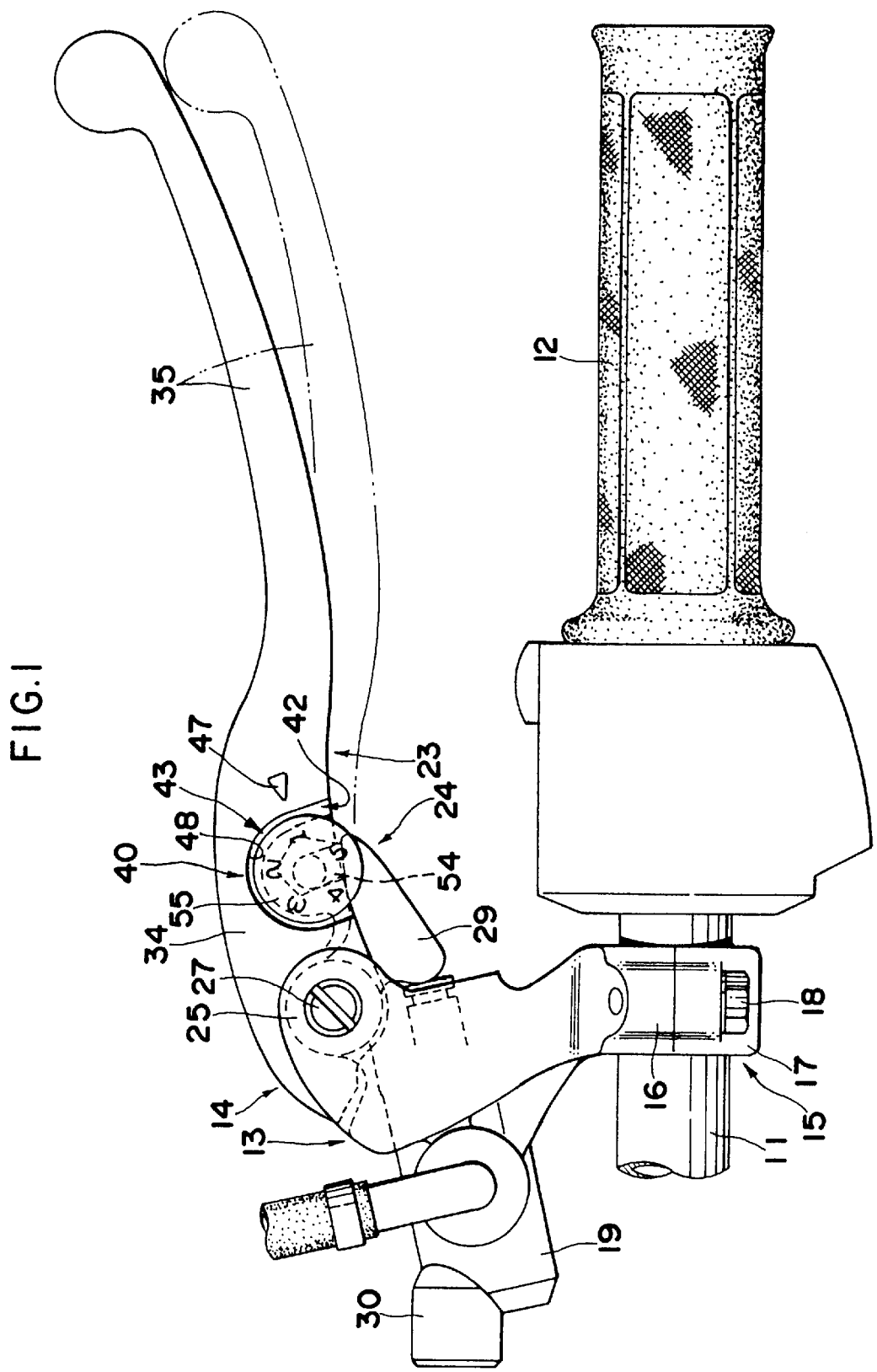
FIG. 1 is a plan view showing the control lever equipment according to a first embodiment of the present invention.

The present invention will be described by way of embodiments referring to the drawings.

Figure 2:
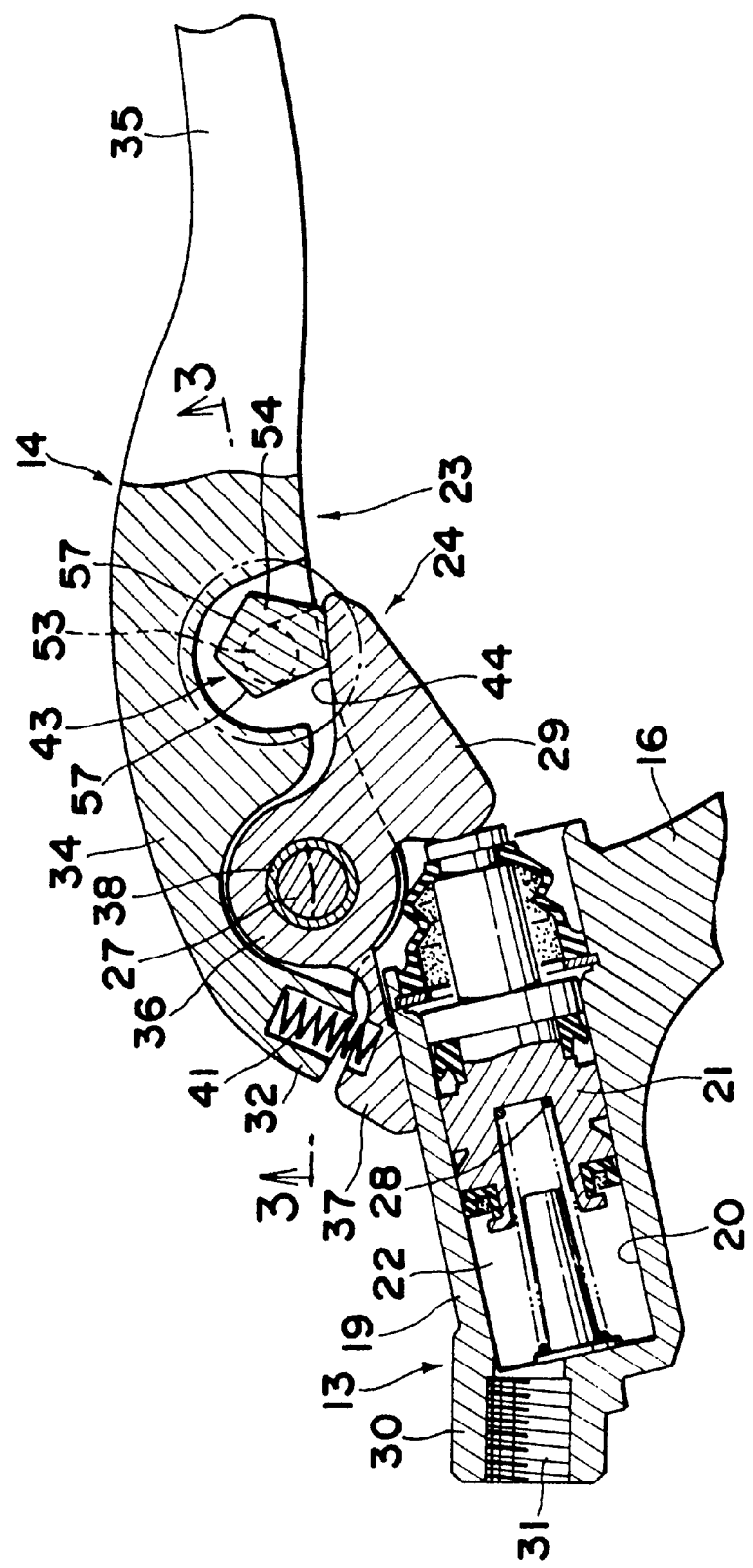
FIG. 2 is a partially sectional plan view of the control lever of the first embodiment.
Figure 3:
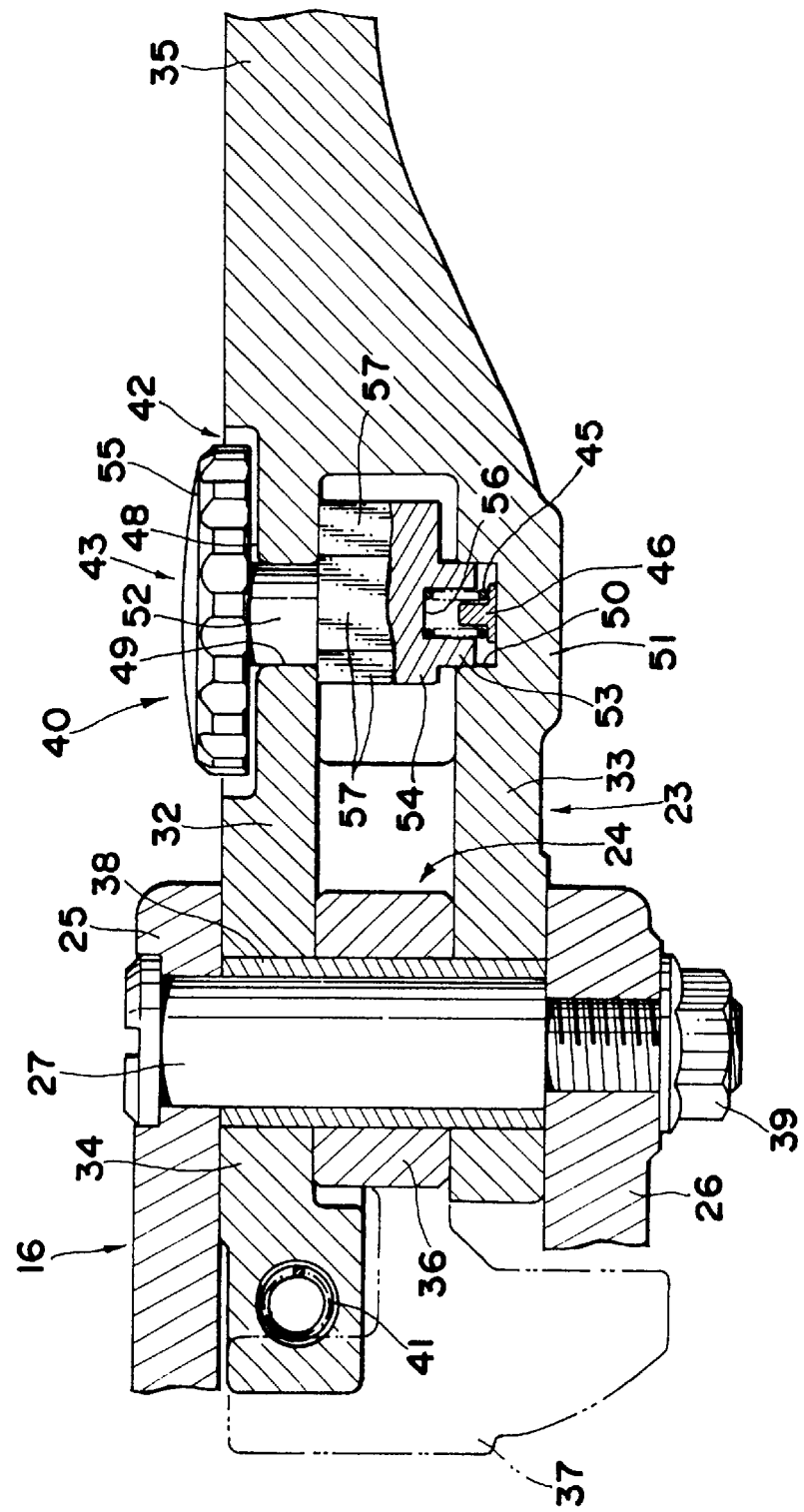
FIG. 3 is a cross-sectional view taken along the line 3—3 in FIG. 2.

FIGS. 1 to 3 show a first embodiment of the present invention. A bar handle for steering a front wheel is provided with a throttle grip 12 on the right end of a handle bar 11.

A hydraulic master cylinder 13 and a brake control lever 14 for a front brake are attached through a holder 15 to the handle bar 11 at a position slightly more inwardly than the grip 12.

The holder 15 is composed essentially of a holder body 16 and a handle clamp 17 and is fixed to the handle bar 11 by clamping the handle bar 11 between the holder body 16 and the handle clamp 17 and fastening them together with a bolt 18.

The master cylinder 13 has a cylinder body 19 formed integrally with the holder body 16. The cylinder body 19 contains a bottomed cylinder bore 20 opening to the right side end, and the cylinder bore 20 contains fluid tight a piston 21 to be able to reciprocate therein. A hydraulic chamber 22 is defined between the piston 21 and the bottom of the cylinder bore 20.

The brake control lever 14 is composed essentially of two pieces, a lever piece 23 and an operating piece 24. The lever piece 23 and the operating piece 24 are supported by a support shaft 27 to be able to pivot independent of each other. The support shaft 27 is attached to a pair of lever holders (an upper lever holder 25 and a lower lever holder 26). A helical return spring 28 is interposed as compressed between the piston 21 in the hydraulic chamber 22 and the bottom of the cylinder bore 20. The piston 21, when not in operation, is urged by the resilience of the return spring 28 toward the opening of the cylinder bore 20, and the tail of the piston 21 protruding from the opening edge fo the cylinder bore 20 is abutted against an operation arm 29 of the operating piece 24 to restrict the piston 21 not to retract any further.

A boss 30 protrudes outward from the bottom of the cylinder body 19. A union hole 31 is defined in the boss 30 to communicate to the hydraulic chamber 22. A brake hose is connected to the union hole 31 using a union bolt (not shown), so that a hydraulic pressure generated in the hydraulic chamber 22 by operating the grip of the brake control lever 14 is supplied from the union hole 31 to a front brake through the brake hose.

The lever piece 23 has a bifurcated hinged portion 34 having an upper arm 32 and a lower arm 33, and a pulling portion 35 extended from the hinged portion 34 to curve gently forward in front of the throttle grip 2. The operating piece 24 has a hinged portion 36, the operating arm 29 located between the hinged portion 34 of the lever piece 23 and the tail of the piston 21, and a stopping piece 37 protruding into the space between the front side wall of the cylinder body 19 and the hinged portion 34 of the lever piece 23.

The operating piece 24 is incorporated beforehand with the lever piece 23 by inserting the sleeve 38 to the hinged portion 36 of the former and to the hinged portion 34 of the latter, and inserting the thus incorporated two hinged portions 34 and 36 to the gap secured between the lever holders 25 and 26 of the cylinder body 19. The support shaft 27 is then inserted to the lever holders 25 and 26 and to the sleeve 38, and a nut 39 is fitted to the lower end of the support shaft 27 to pivotally support the lever piece 23 and the operating piece 24 independent of each other.

The abutment of the operating arm 29 against the piston 21 urges the lever piece 23 and the operating piece 24 to turn counterclockwise in FIGS. 1 and 2 on the support shaft 27 as a point of support. Meanwhile, the abutment of the stopping piece 37 against the cylinder body 19 regulates the backward limit of these two pieces 23 and 24 when they are not operated and also secures a predetermined grip allowance between the throttle grip 12 and the pulling portion 35 of the lever piece 23.

A grip allowance adjusting mechanism 40 is interposed between the hinged portion 34 of the lever piece 23 and the operating arm 29 of the operating piece 24.

The grip allowance is designed to be adjusted by using the grip allowance adjusting mechanism 40 depending on the constitution and preference of a rider. A return spring 41 is interposed as compressed between the upper arm 32 of the hinged portion 34 and the stopping piece 37 to urge resiliently the lever piece 23 and the operating piece 24 to be spaced away from each other, preventing backlash of these pieces.

The grip allowance adjusting mechanism 40 contains an adjusting pin fitting hole 42 defined in the hinged portion 34 of the lever piece 23, an adjusting pin 43 pivotally fitted in the fitting hole 42, a cam abutting face (the face to be brought into contact with a cam) 44 formed on the operating arm 29 of the operating piece 24, a coil spring 45 and a retainer 46 which are attached to the shaft end of the adjusting pin 43, and an index 47 engraved on the upper surface of the hinged portion 34 of the lever piece 23 in the vicinity of the fitting hole 42. The adjusting pin 43 is disposed pivotally on an axis parallel to the support shaft 27.

The fitting hole 42 contains a counterbore 48 and a pin inserting hole 49 defined on the upper side and the lower side of the upper arm 32 of the hinged portion 34 respectively, both the counterbore 48 and the inserting hole 49 opening toward the operating arm 29; a bearing recess 50 defined on the upper surface of the lower arm 33 to open also toward the operating arm 29; and a bottom 51 of the bearing recess 50. The counterbore 48, the pin inserting hole 49 and the bearing recess 50 each have a semicircular shape. The pin inserting hole 49 and the bearing recess 50 are formed to have diameters which are equal to those of pivoting shafts 52 and 53 of the adjusting pin 43, respectively.

The adjusting pin 43 contains at the intermediate portion a cam clutch section 54, the pivoting shafts 52 and 53 formed to continue from the upper end and the lower end of the cam clutch section 54 respectively, a large-diameter operating dial 55 located at the upper end of the upper pivoting shaft 52, and a recess 56 formed at the center of the lower end of the lower pivoting shaft 53. The cam clutch section 54 has on the circumference a plurality of (e.g., five) equally divided cam faces 57 located respectively at different distances from the axis of the adjusting pin 43. That is, the cam clutch section 54 has an irregular pentagonal shape. The operating dial 55 has on the upper surface digits indicating pivoting positions of the adjusting pin 43 for the five cam faces, respectively.

After the coil spring 45 and the retainer 46 are fitted to the adjusting pin 43, the upper pivoting shaft 52 and the lower pivoting shaft 53 are inserted from the opening facing the operating arm 29 into the pin inserting hole 49 of the upper arm 32 and to the bearing recess 52 of the lower arm respectively, and thus the cam clutch section 54 and the upper end operating dial 55 are contained in the space defined between the upper arm 32 and the lower arm 33 of the lever piece 23 and in the counterbore 48 of the upper arm 32, respectively.

The coil spring 45 is compressed together with the retainer 46 into the space defined between the recess 56 and the bottom 51 to be coaxial with the adjusting pin 43 and urges the adjusting pin 43 resiliently upward. Meanwhile, resilient engagement of the upper face of the cam clutch section 54 with the upper arm 32 regulates upward shifting of the adjusting pin 43.

The cam abutting face 44 is constantly brought into contact with one of the five cam faces 57 under the resilience acted by the return springs 28 and 41. The adjusting pin 43 secures a predetermined grip allowance, while preventing the adjusting pin 43 from slipping off from the fitting hole 42.

When the grip allowance is to be changed, the lever piece 23 is pivoted in the anti-gripping direction (toward the front of the body of the motor bicycle) against the resilience of the return spring 41 to release temporarily the abutment between the cam clutch section 54 and the cam abutting face 44. In this state, the operating dial 55 is then operated to turn the adjusting pin 43 and select a desired digit on the operating dial 55 and bring it in alignment with the index 47. Thus, another cam face associated with the thus selected digit is directed to the cam abutting face 44. The pivoting of the lever piece 23 in the anti-gripping direction is released to bring the thus selected cam face 57 in abutment with the cam abutting face 44, thus setting the changed grip allowance.

In this embodiment, since the resilience of the coil spring 45 is exerted around the axis of the adjusting pin 43, the pin 43 is urged resiliently upward without tilting. As a result, unnecessary backlash between the lever piece 23 and the adjusting pin 43 can be eliminated, preventing efficiently rattling and abrasion attributed to vibration during driving. Further, since the adjusting pin 43 is retained in the fitting hole 42 without tilting, the adjusting pin 43 can be operated smoothly to facilitate change of the grip allowance. Since no unnecessary load is applied to the components of the grip allowance adjusting mechanism 40, durability of the equipment can be improved.

Here, as a modification of the first embodiment, the coil spring 45 is fitted on the lower pivoting shaft 53 of the adjusting pin 43 to engage the upper end of the spring 45 with a step such as the lower face of the cam clutch section 54, and thus the resilience of the coil spring 45 can be exerted around the axis of the adjusting pin 43. Further, the resilient piece may be a helical compression spring or other compression springs or may be other materials including rubbers or soft synthetic resins.

Figure 4:
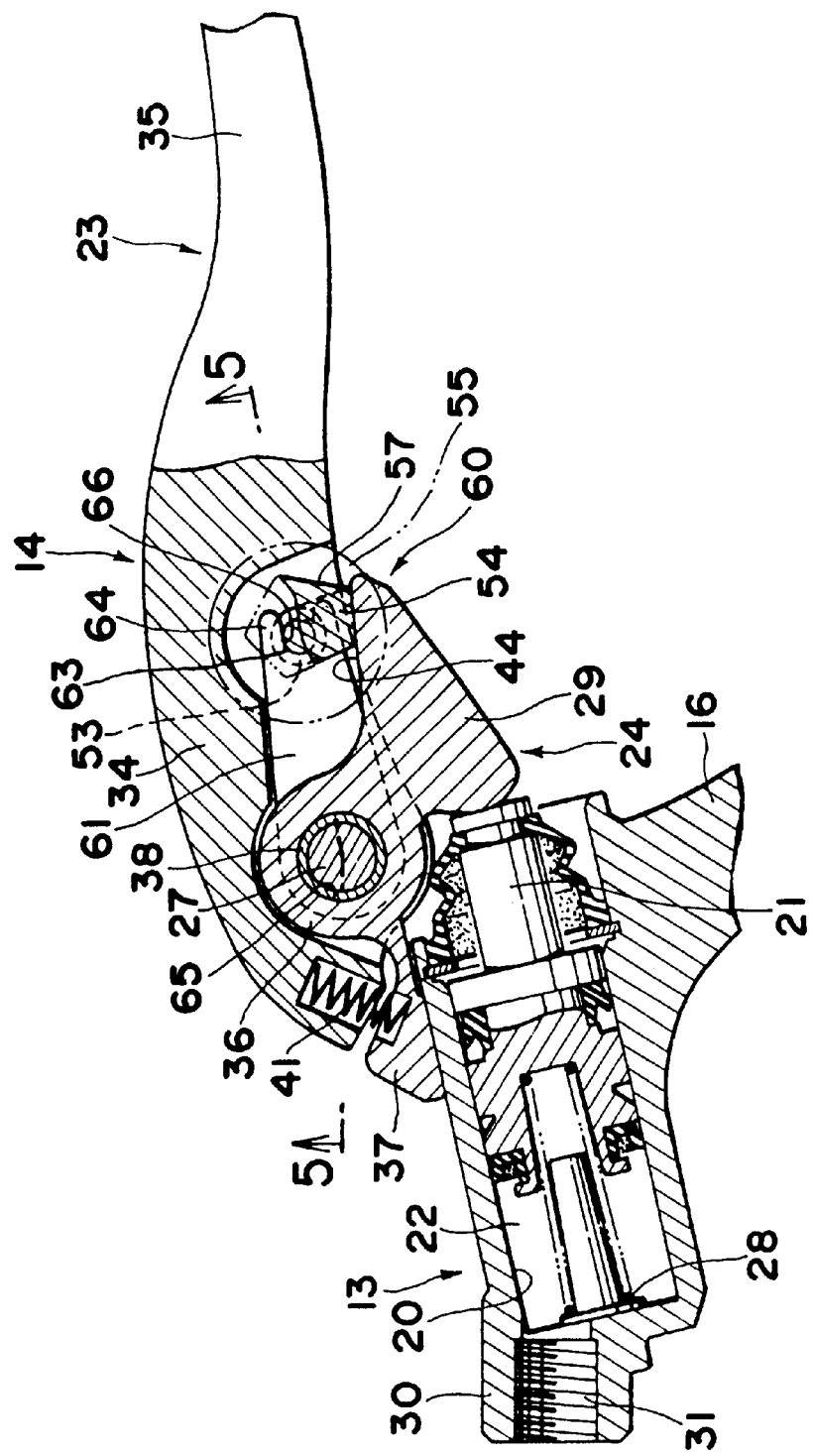
FIG. 4 is a plan view showing the control lever equipment according to a second embodiment of the present invention.
Figure 5:
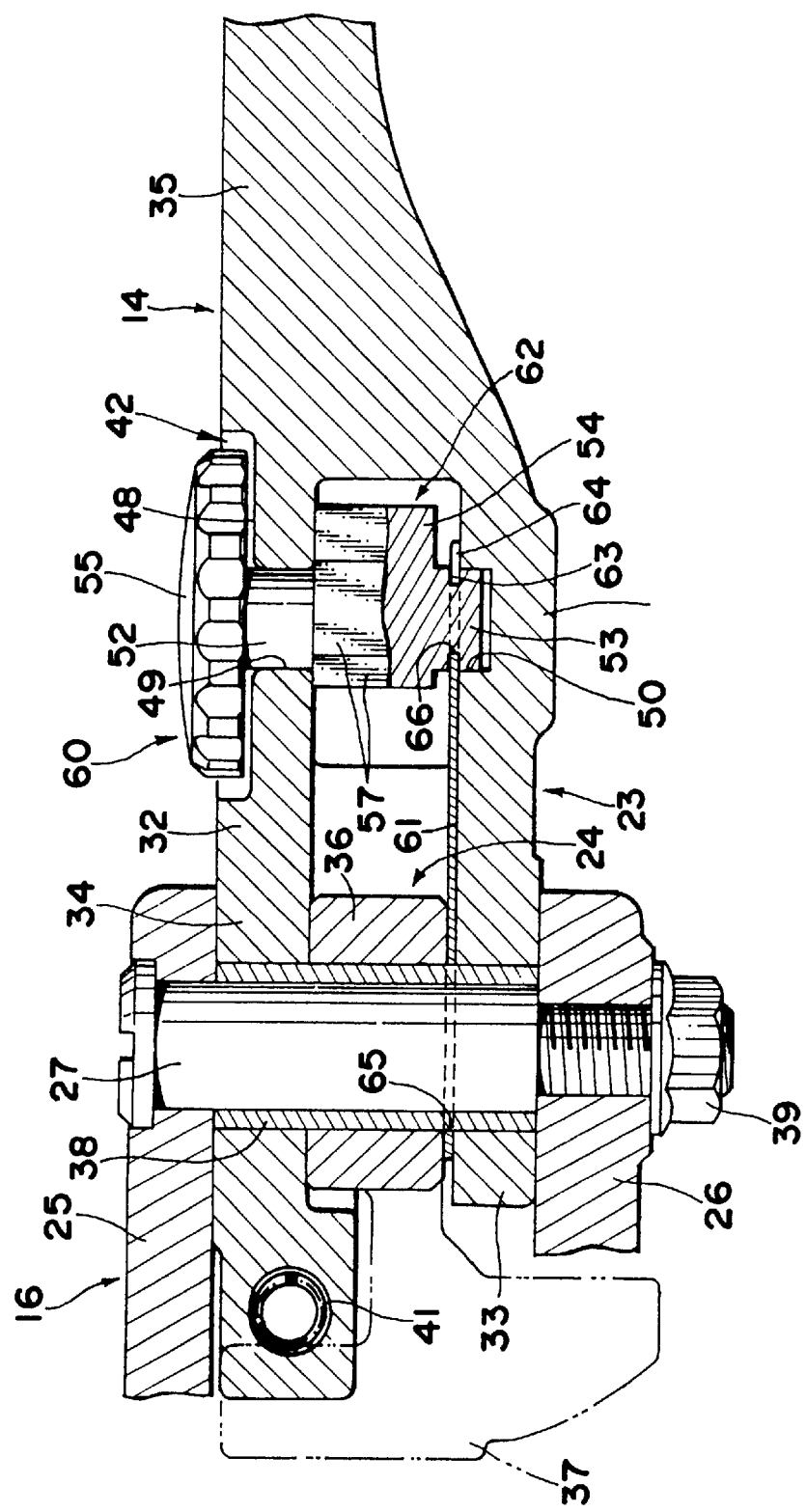
FIG. 5 is a cross-sectional view taken along the line 5—5 in FIG. 4.

FIGS. 4 and 5 show a second embodiment of the present invention. The constitution of the grip allowance adjusting mechanism, the hydraulic master cylinder and the brake control lever in the second embodiment are substantially the same as the counterparts in the first embodiment respectively, except that a part of the structure of the adjusting pin of the grip allowance adjusting mechanism and the resilient piece are different. Therefore, the same and like elements as in the first embodiment are affixed with the same reference numbers respectively, and detailed description of them will be omitted.

In the grip allowance adjusting mechanism 60 of this embodiment, a leaf spring 61 is used as the resilient piece in place of the coil spring. Meanwhile, an adjusting pin 62 which is formed substantially the same as the counterpart in the first embodiment is used, except that a narrow circumferential groove 63 is formed on the outer circumference of the lower pivoting shaft 53 and that the dent 56 in the first embodiment is omitted.

The leaf spring 61 has a bifurcated arm 64 and a fitting hole 65 having a diameter substantially equal to that of the sleeve 38 at the distal end and at the proximal end, respectively. The bifurcated arm 64 contains a pair of notches 66 for defining together a clearance which is as wide as the shaft diameter in the circumferential groove 63. This leaf spring 61 is slightly curved to have a concave upper surface in a free state before incorporated into the grip allowance adjusting mechanism 60.

The leaf spring 61 having a concave upper surface is attached to the lever piece 23 by inserting the bifurcated arm 64 to the circumferential groove 63, fitting the adjusting pin 62 in the fitting hole 42, and inserting a support shaft 27 and a sleeve 38 to the fitting hole 65. Thus, the leaf spring 61 is clamped between the hinged portion 36 of the operating piece 24 and the lower arm 33 of the lever piece 23.

Since the curved configuration of the leaf spring 61 in the free state is corrected along the upper surface of the lower arm 33, when clamped as described above, resilience is generated at the distal end portion of the spring 61 in the direction opposite to the bottom 51 of the bearing recess 50 (upward). This resilience is exerted around the axis of the adjusting pin 62 through the bifurcated arm 64 to urge resiliently the adjusting pin 62 upward without tilting and bring the cam clutch section 54 and the upper arm 32 into resilient face abutment with each other, thus regulating shifting of the adjusting pin 62.

In the above embodiment, the circumferential groove 63 is formed on the adjusting pin 62, and the distal end portion of the leaf spring 61 is designed to be inserted to the circumferential groove 63. However, the bifurcated arm 64 formed at the distal end portion of the leaf spring 61 may be engaged with a step such as the lower face of the cam clutch section 54, and thus resilience can also be exerted around the axis of the adjusting pin 62. While the leaf spring 61 is caused to generate resilience against the adjusting pin 62 by fixing the proximal end portion thereof, the mode of fixing the leaf spring is not necessarily limited to that in the second embodiment.

It should be apparent to those skilled in the art that the present invention may be embodied in many other specific forms without departing from the spirit or scope of the invention.

In the above embodiments, while the adjusting pins 43 and 62 to be urged by the springs 45 and 61, respectively, are designed to be borne by resilient engagement between the cam clutch section 54 and the upper arm 32, shifting of the adjusting pins can be regulated by other constitutions.

Further, the present invention may assume a constitution in which the adjusting pins in the above embodiments are inverted, and the operating dial is partly exposed toward the rider. Meanwhile, contrary to the above embodiments, the adjusting pins and the like and the cam abutting face may be allowed to be attached to the operating piece and to the lever piece, respectively.

The present invention can be applied also as a clutch control lever equipment. In the present invention, the hydraulic master cylinder may be replaced with an operating wire if the configuration of the operating piece is modified.

Therefore, the present examples and embodiments are to be considered as illustrative and not restrictive, and the invention is not to be limited to the details given herein, but may be modified within the scope of the appended claims.

What is claimed is:

1. A control lever equipment for a bar handle vehicle comprising a support shaft attached to a holder fixed to a handle bar, a control lever pivotally supported by the support shaft, and a grip allowance adjusting mechanism for widening and narrowing a grip allowance to be secured between the control lever and a grip of the handle bar;

wherein the control lever is composed essentially of a lever piece and an operating piece which pivot coaxially on the support shaft independent of each other;

the grip allowance adjusting mechanism comprising an adjusting pin attached to one of the lever piece and the operating piece pivotally on an axis parallel to an axis of the support shaft; a plurality of cam faces formed contiguously on a periphery of a shaft of the adjusting pin so as to locate the cam faces at different distances from the axis of the adjusting pin, respectively; and a cam abutting face formed on one of the operating piece and the lever piece;

the cam abutting face being operative to be selectively urged into abutment with any one of the cam faces by pivoting the adjusting pin;

a bearing for journaling the shaft of the adjusting pin, a resilient piece being interposed between the adjusting pin and the bearing, the resilient piece being disposed on one of the lever piece and the operating piece and being operative to engage the adjusting pin to bias the adjusting pin concentrically with respect to the axis thereof with respect to the one of the lever piece and the operating piece.

2. The control lever equipment for a bar handle vehicle according to claim 1, wherein the resilient piece is a coil spring disposed around the axis of the adjusting pin shaft.

3. The control lever equipment for a bar handle vehicle according to claim 2, wherein the bearing is a recess formed in one of the lever piece and the operating piece, a bottom of the recess serves as a seat for the resilient piece.

4. The control lever equipment for a bar handle vehicle according to claim 1, wherein the resilient piece is a leaf spring having a bifurcated arm disposed around the shaft of the adjusting pin and being operative to bias the pin axially.

5. The control lever equipment for a bar handle vehicle according to claim 4, wherein the adjusting pin has a circumferential groove formed on the shaft thereof engaged by the leaf spring arm.

* * * * *